United States Patent
Kajiro

(10) Patent No.: US 9,766,444 B2
(45) Date of Patent: Sep. 19, 2017

(54) DIGITAL MICROSCOPE

(75) Inventor: Yoichi Kajiro, Tokyo (JP)

(73) Assignee: HIROX CO., LTD., Tokyo (JP)

( * ) Notice: Subject to any disclaimer, the term of this patent is extended or adjusted under 35 U.S.C. 154(b) by 725 days.

(21) Appl. No.: 13/634,082

(22) PCT Filed: Apr. 28, 2011

(86) PCT No.: PCT/JP2011/002498
§ 371 (c)(1),
(2), (4) Date: Sep. 11, 2012

(87) PCT Pub. No.: WO2011/142099
PCT Pub. Date: Nov. 17, 2011

(65) Prior Publication Data
US 2013/0044202 A1    Feb. 21, 2013

(30) Foreign Application Priority Data

May 10, 2010 (JP) ................................. 2010-108404

(51) Int. Cl.
G02B 21/06 (2006.01)
G02B 21/12 (2006.01)
G02B 21/36 (2006.01)
G02B 6/35 (2006.01)

(52) U.S. Cl.
CPC ......... *G02B 21/125* (2013.01); *G02B 21/364* (2013.01); *G02B 21/365* (2013.01); *G02B 21/368* (2013.01); *G02B 6/3508* (2013.01)

(58) Field of Classification Search
CPC .. G02B 21/125; G02B 21/364; G02B 21/368; G02B 21/365; G02B 6/3508
See application file for complete search history.

(56) References Cited

U.S. PATENT DOCUMENTS

| 5,153,668 A | 10/1992 | Katzir et al. |
| 6,633,375 B1 * | 10/2003 | Veith et al. ................ 356/237.4 |
| 6,657,781 B2 * | 12/2003 | Murakami et al. ........... 359/381 |

(Continued)

FOREIGN PATENT DOCUMENTS

| CN | 101263411 A | 9/2008 |
| EP | 0504940 B1 | 8/1999 |

(Continued)

OTHER PUBLICATIONS

Satake (English Translation of JP 2004-170574 A).*

(Continued)

*Primary Examiner* — Joseph Ustaris
*Assistant Examiner* — Jill Sechser
(74) *Attorney, Agent, or Firm* — Pearne & Gordon LLP

(57) ABSTRACT

A digital microscope (1) includes an optical fiber bundle (17) that supplies bright field light, an optical fiber bundle (18) that supplies dark field light, an optical fiber bundle (19) for causing light from a light source to enter the optical fiber bundle (17) (18) and a mechanism for changing a mixture ratio of the bright field light and the dark field light according to operation in an operating section (26). A light entry end of the optical fiber bundle (17) and a light entry end of the optical fiber bundle (18) are arranged adjacent to each other to face in the same direction. A light exit end of the optical fiber (19) is arranged to be opposed to both of the light entry ends.

5 Claims, 14 Drawing Sheets

(56) References Cited

U.S. PATENT DOCUMENTS

| | | |
|---|---|---|
| 2004/0001253 A1 | 1/2004 | Abe et al. |
| 2005/0259245 A1 | 11/2005 | Cemic et al. |
| 2007/0014002 A1 | 1/2007 | Vodyanoy et al. |
| 2007/0097498 A1* | 5/2007 | Knoblich ............... G02B 21/06 359/388 |
| 2007/0242336 A1* | 10/2007 | Vodyanoy .......... G01N 21/6458 359/234 |

FOREIGN PATENT DOCUMENTS

| | | |
|---|---|---|
| JP | 02-242214 A | 9/1990 |
| JP | 04-086614 A | 3/1992 |
| JP | 05-030821 U | 4/1993 |
| JP | 05-30823 U | 4/1993 |
| JP | 05-093869 A | 4/1993 |
| JP | 05-341200 A | 12/1993 |
| JP | 2001-272606 A | 10/2001 |
| JP | 2004-170574 A | 6/2004 |
| JP | 2005-227442 A | 8/2005 |
| JP | 2005-536732 A | 12/2005 |
| JP | 2006-301523 A | 11/2006 |
| JP | 2006-323075 A | 11/2006 |
| JP | 2007-178661 A | 7/2007 |
| JP | 2009-128881 A | 6/2009 |

OTHER PUBLICATIONS

International Search Report for PCT/JP2011/002498; Jun. 7, 2011.
Extended European Search Report issued in Application No. 11780359.3 dated Dec. 13, 2013.
Decision on Grant for Russian Application No. 2012138165/28(061865) dated Apr. 2, 2015.
Chinese Office action for application No. 201180008442.5 dated Aug. 29, 2014.
Korean Office action for 10-2012-7020167 dated Jun. 16, 2017.

* cited by examiner

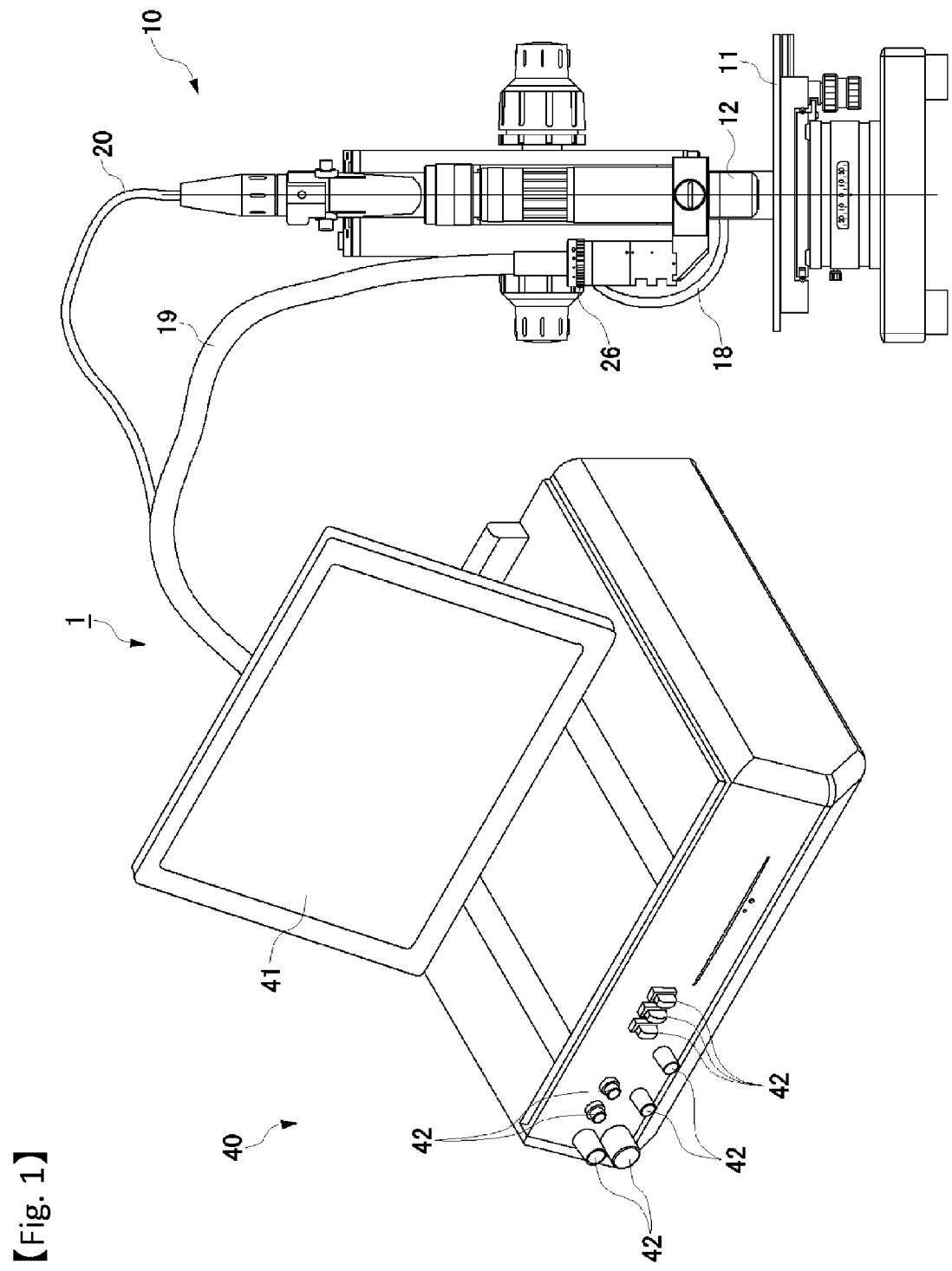
[Fig. 1]

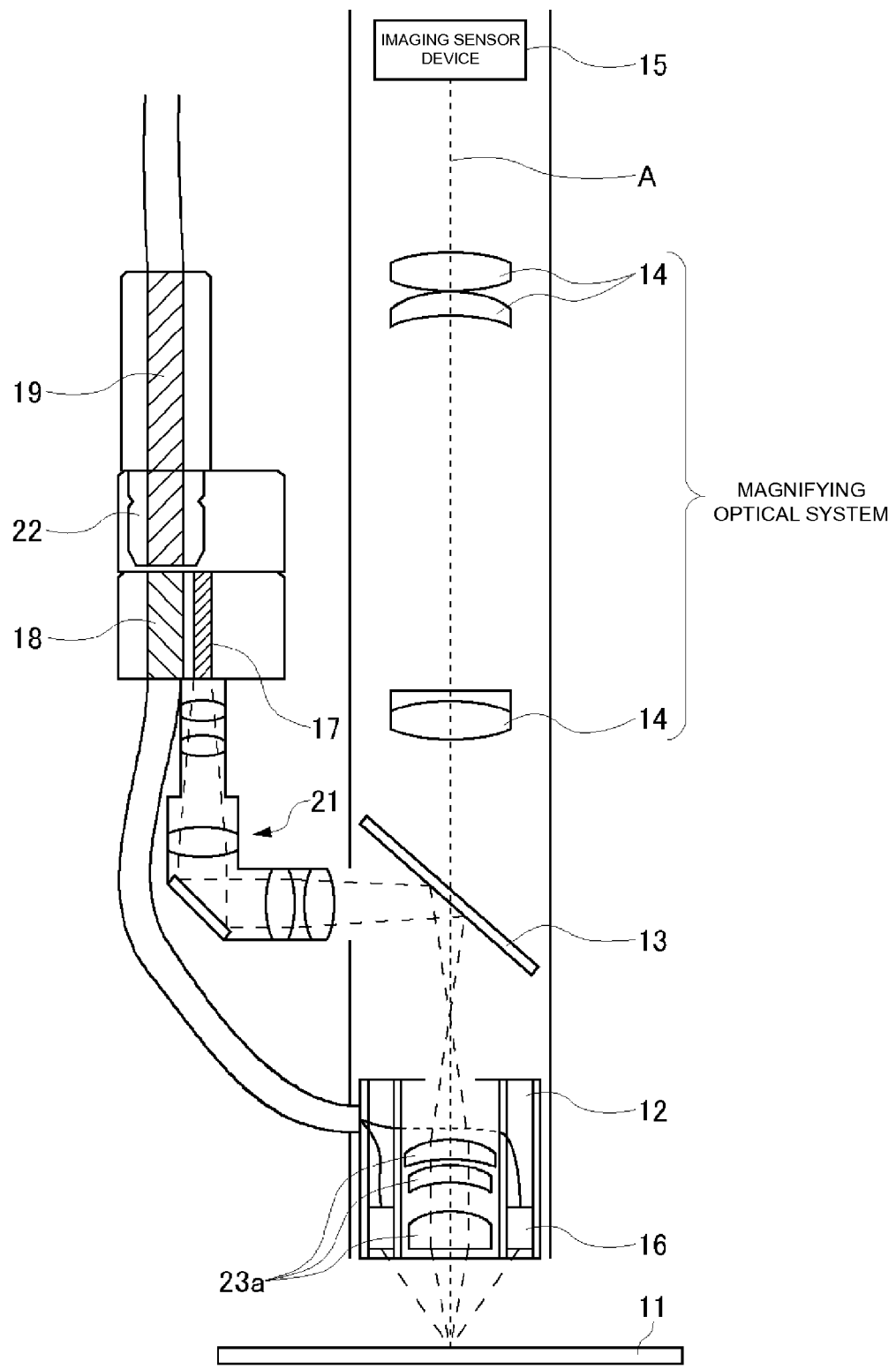
[Fig. 2]

[Fig. 3]
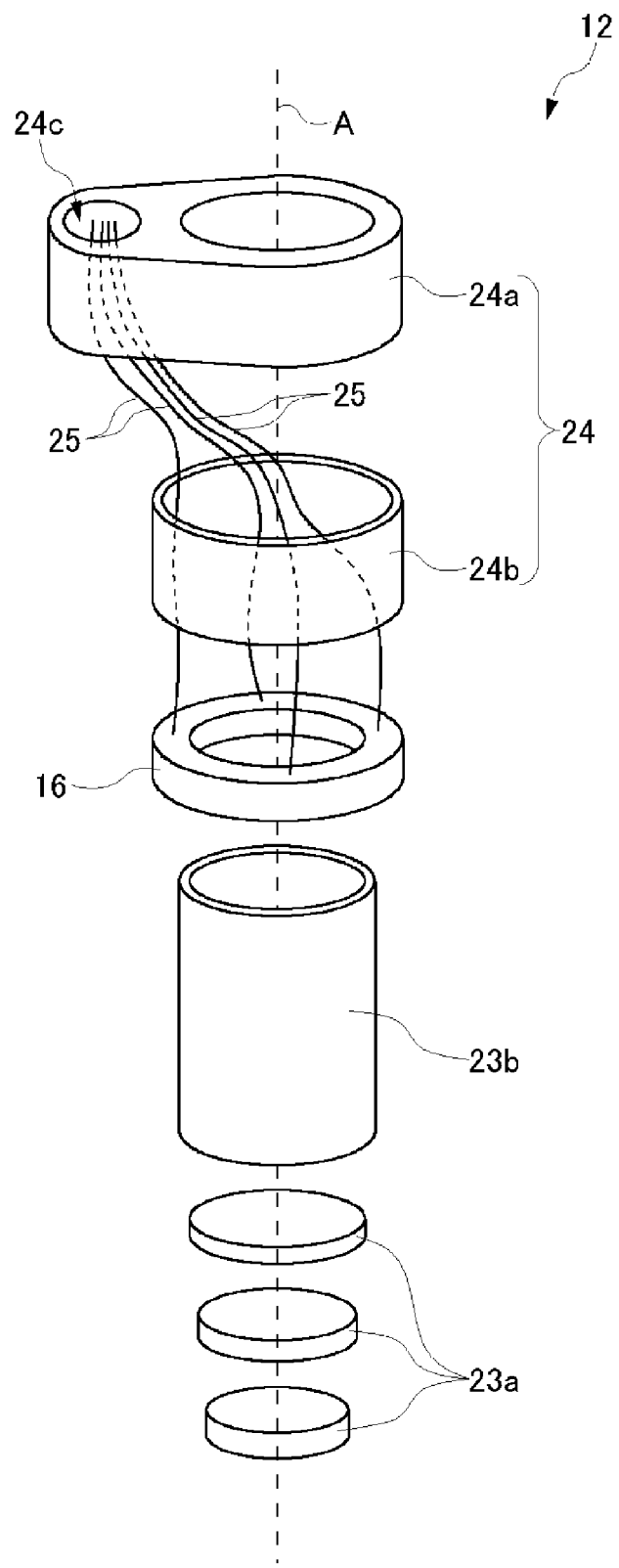

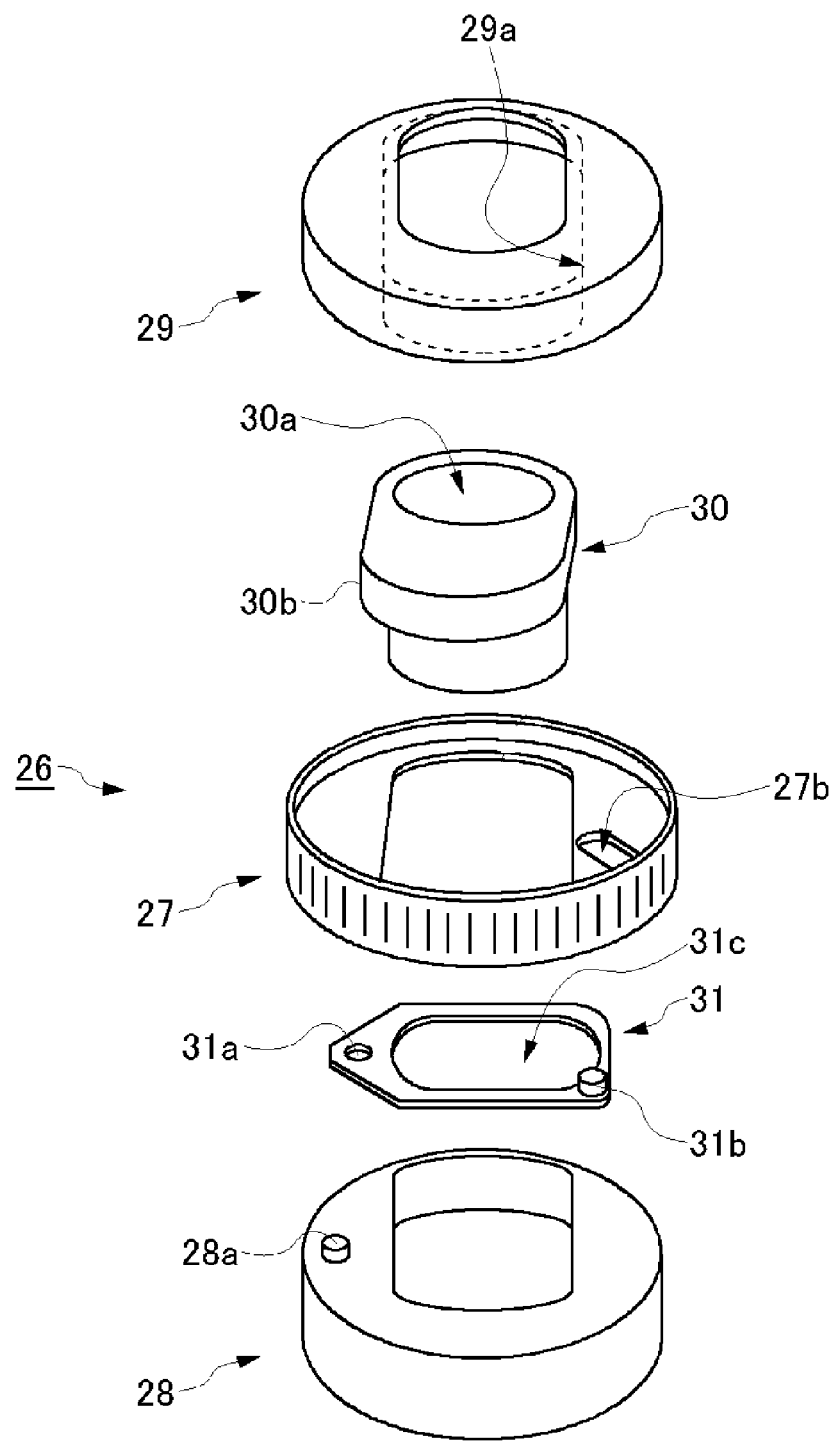
[Fig. 4]

【Fig. 5A】
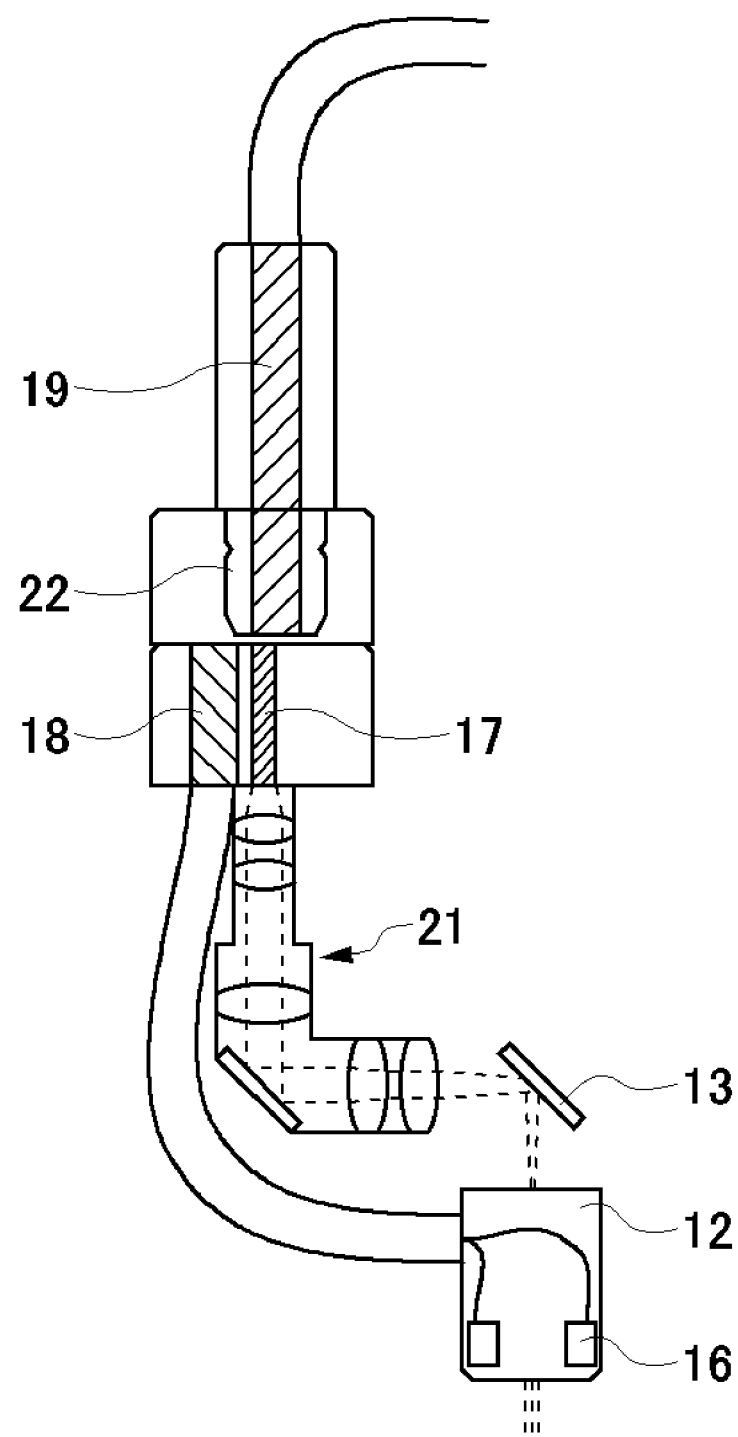
BRIGHT FIELD LIGHTING

【Fig. 5B】
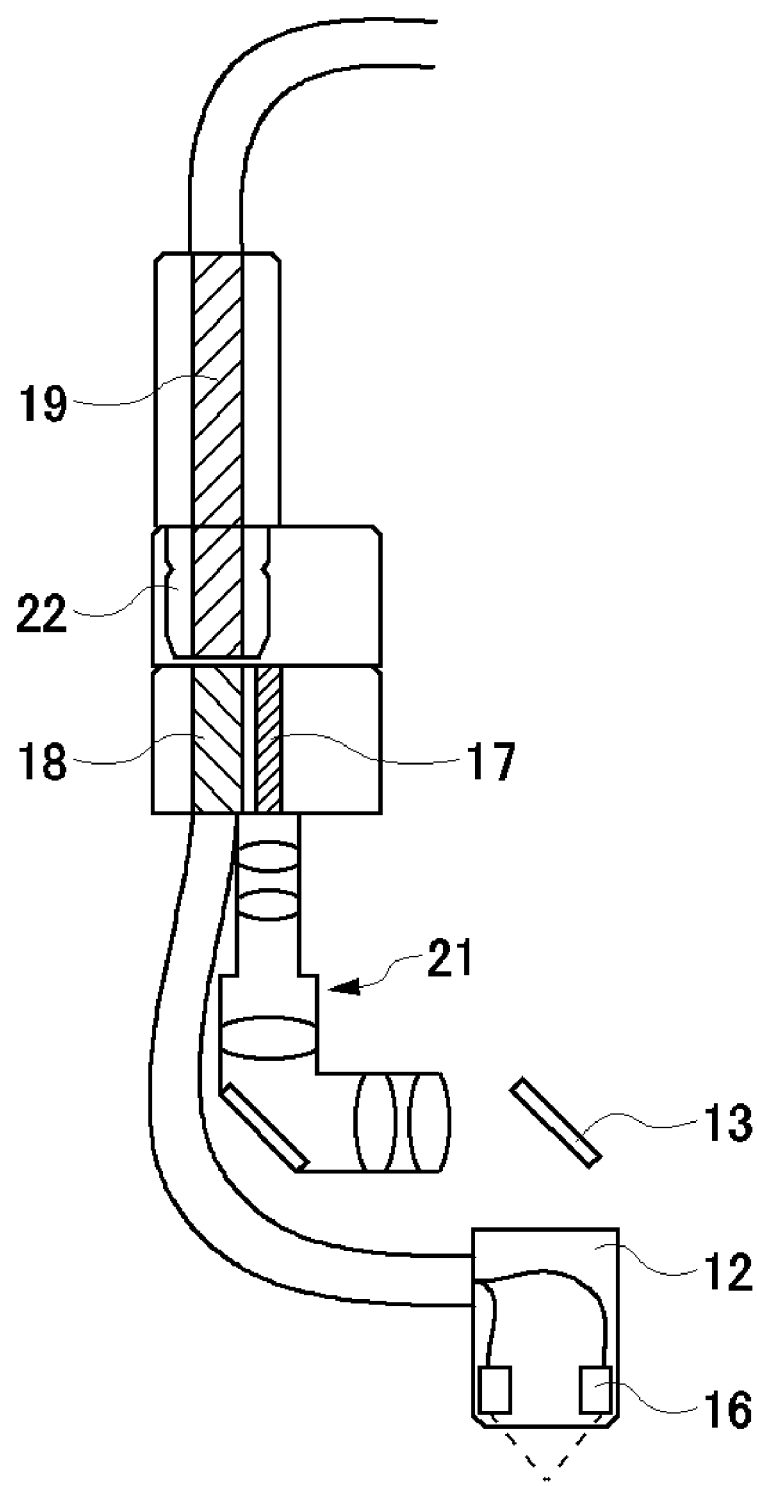
DARK FIELD LIGHTING

[Fig. 5C]
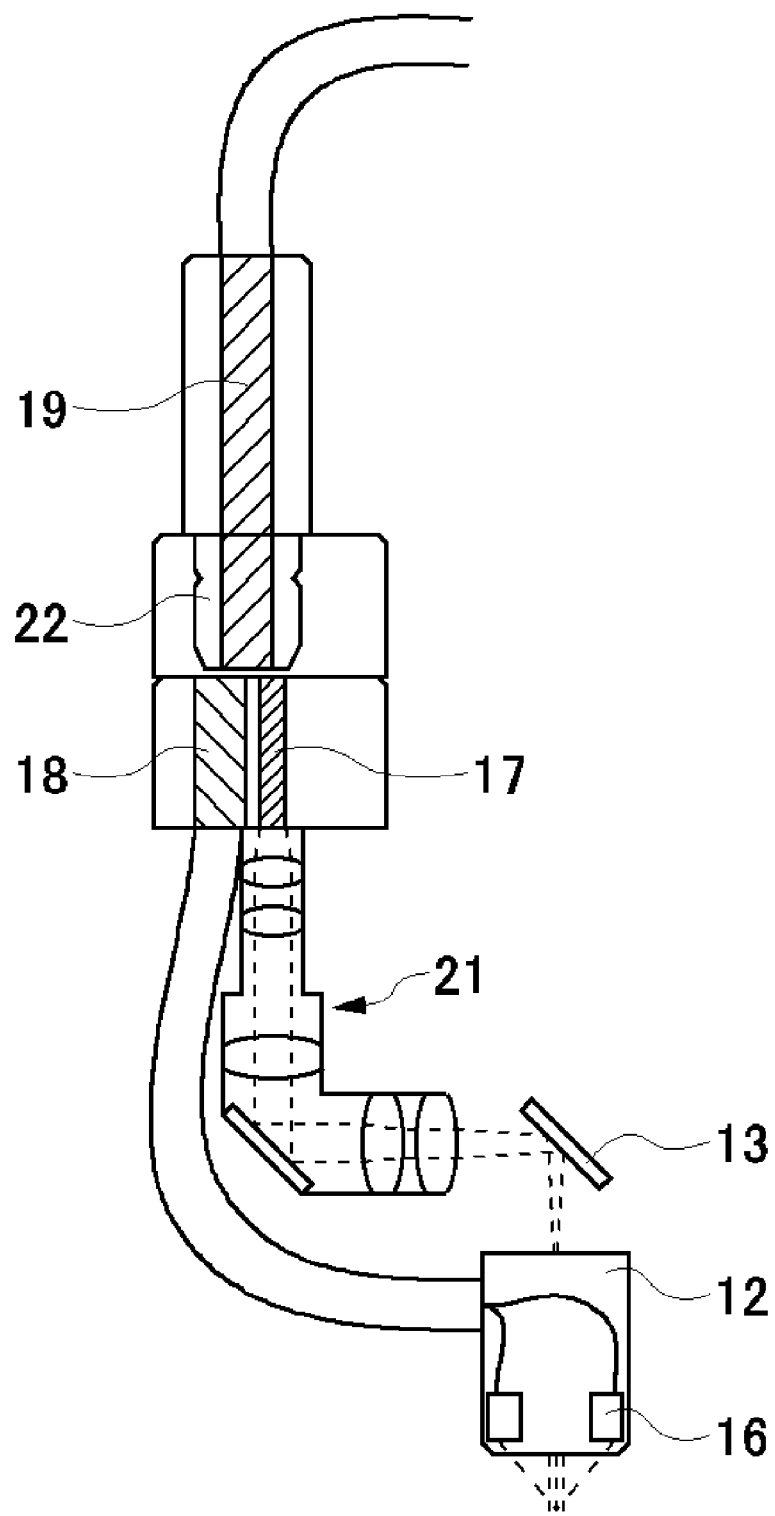
BRIGHT AND DARK FIELD MIXTURE LIGHTING

[Fig. 6A]
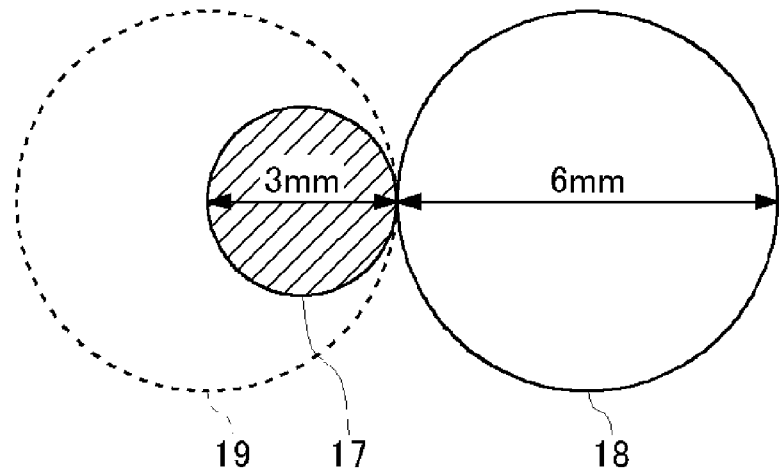
[Fig. 6B]
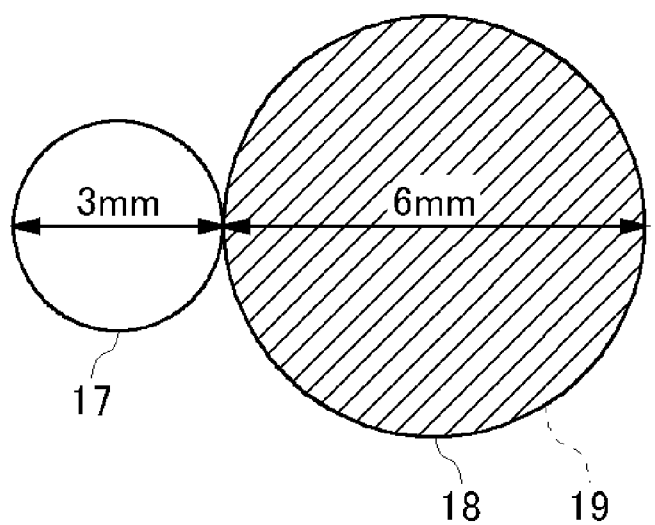
[Fig. 6C]
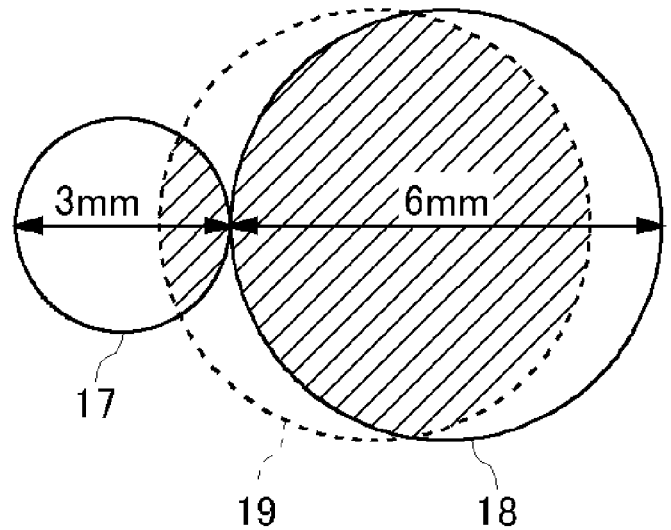

[Fig. 7A]
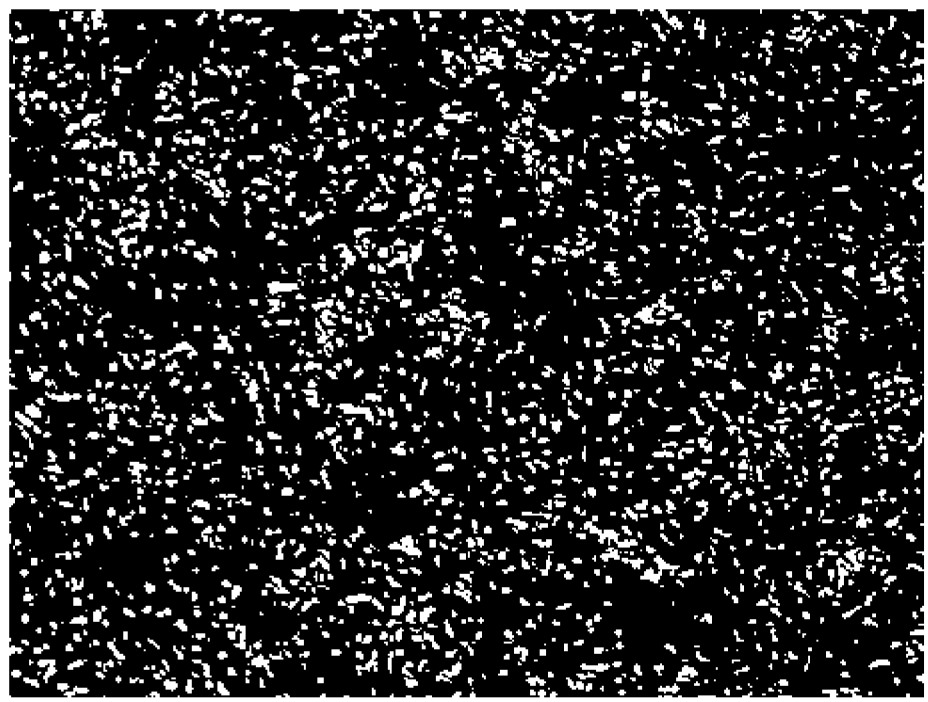
[Fig. 7B]
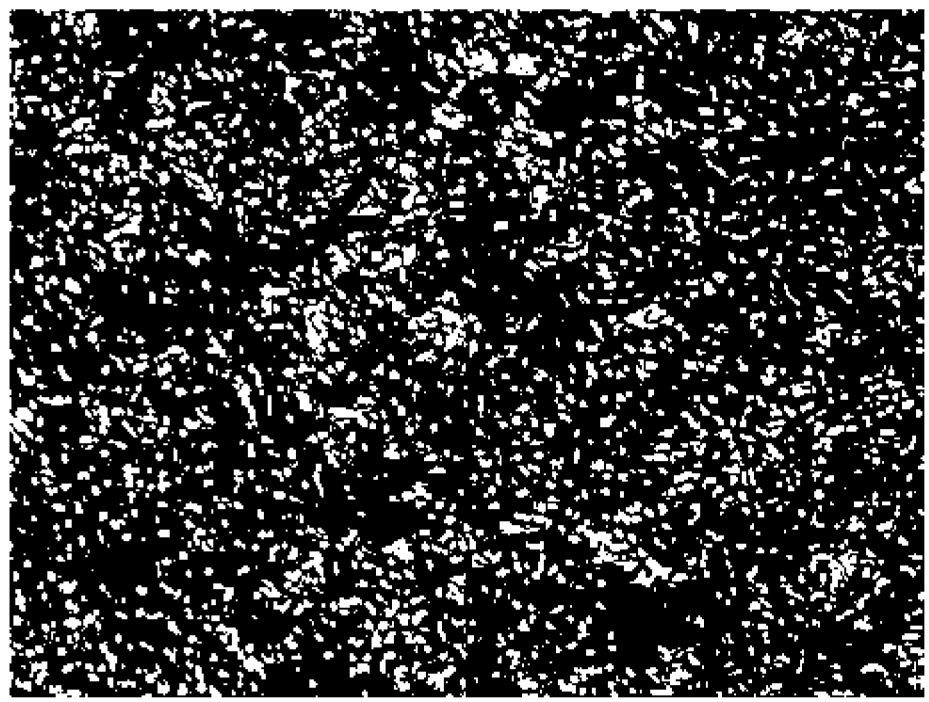

【Fig. 7C】
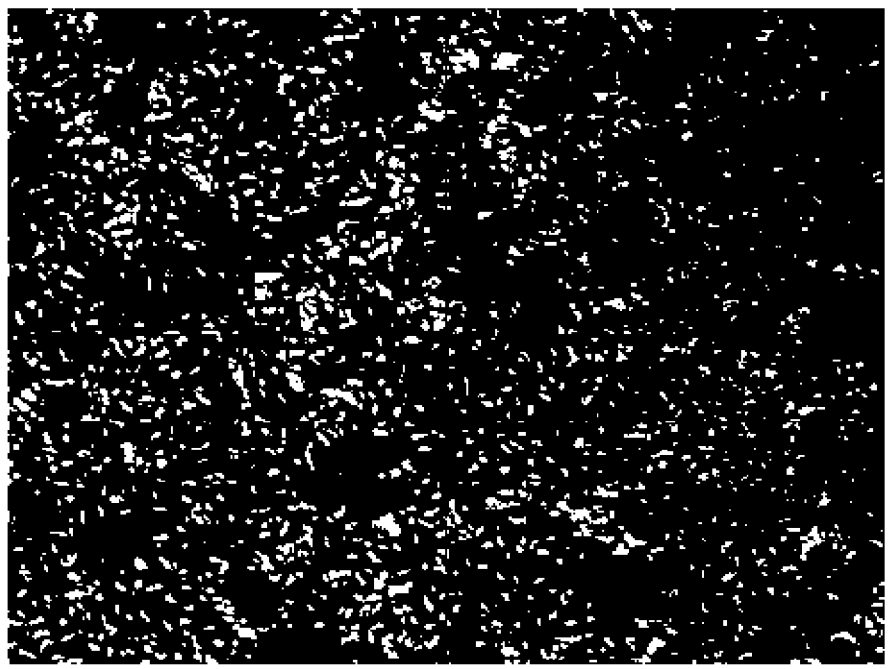
【Fig. 7D】
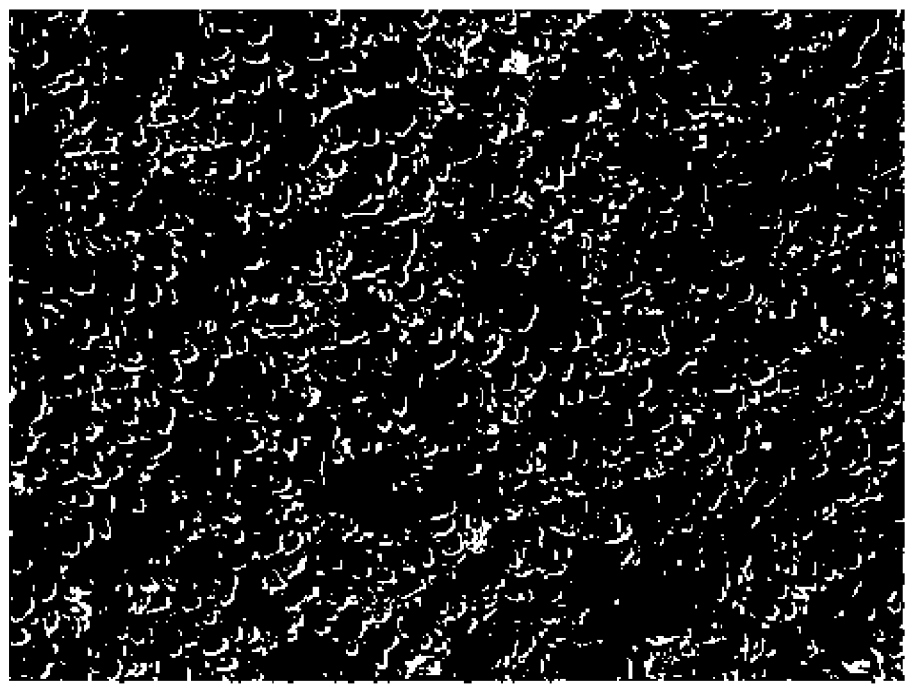

【Fig. 7E】
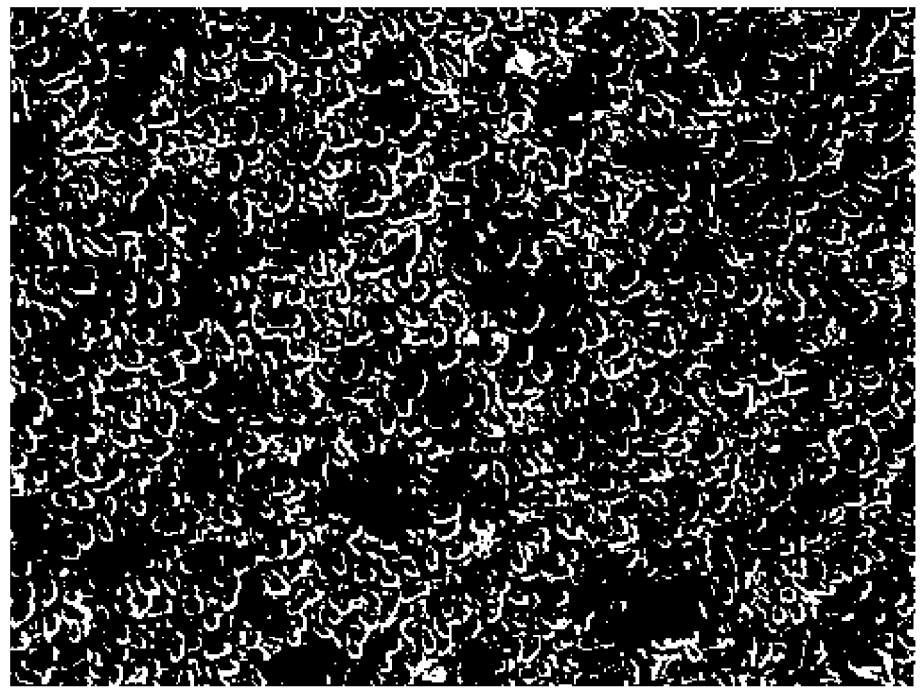
【Fig. 7F】
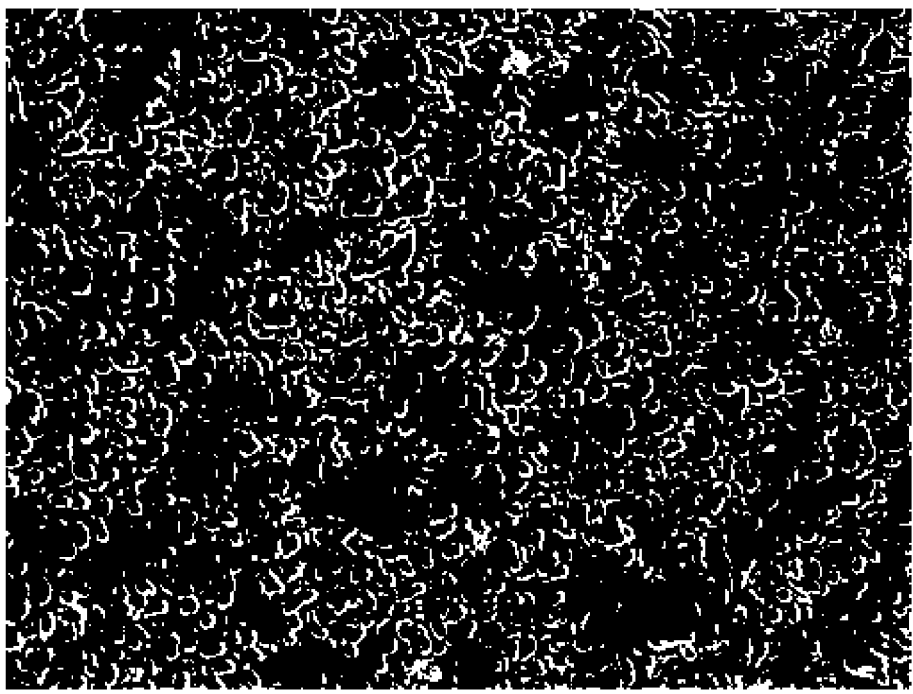

【Fig. 8】
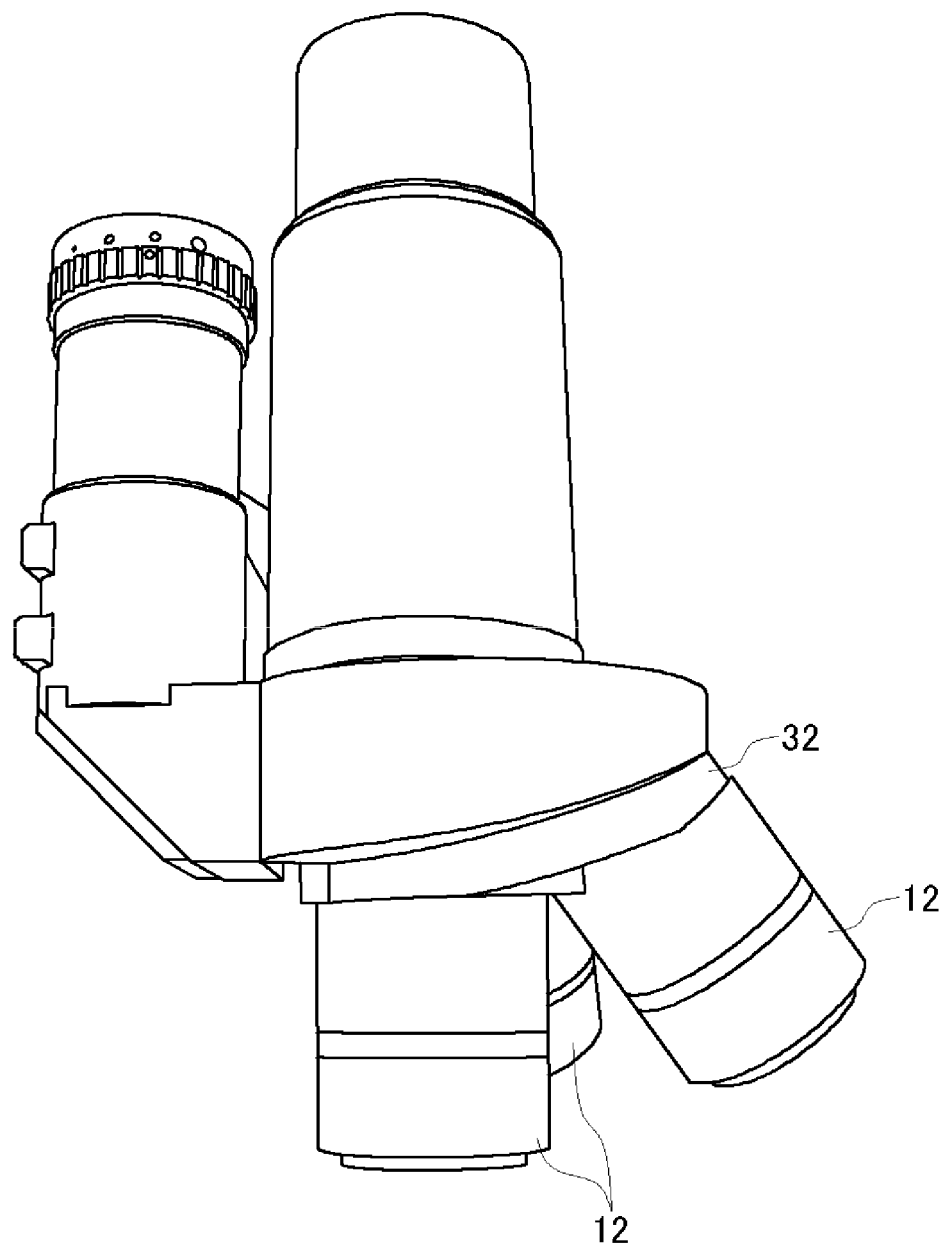

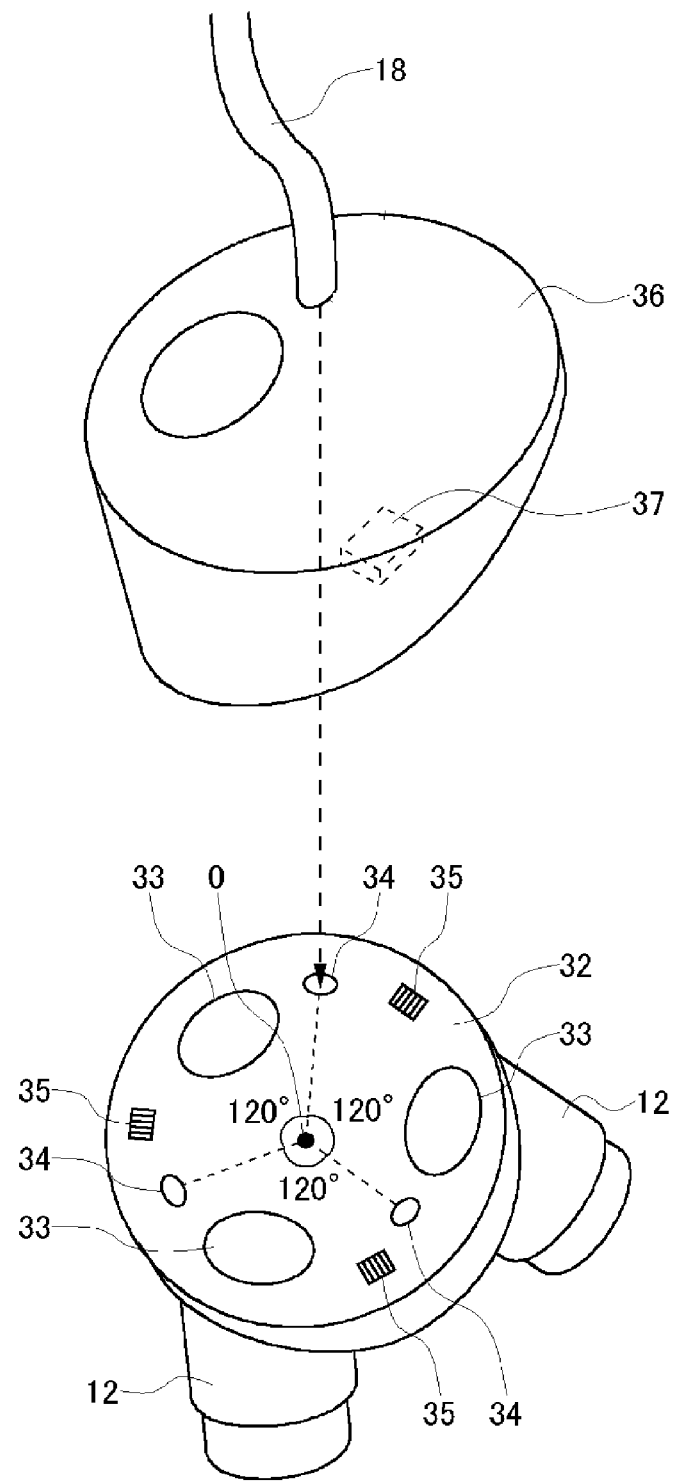
[Fig. 9]

【Fig. 10】
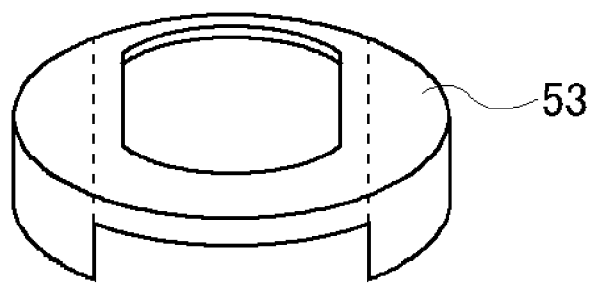
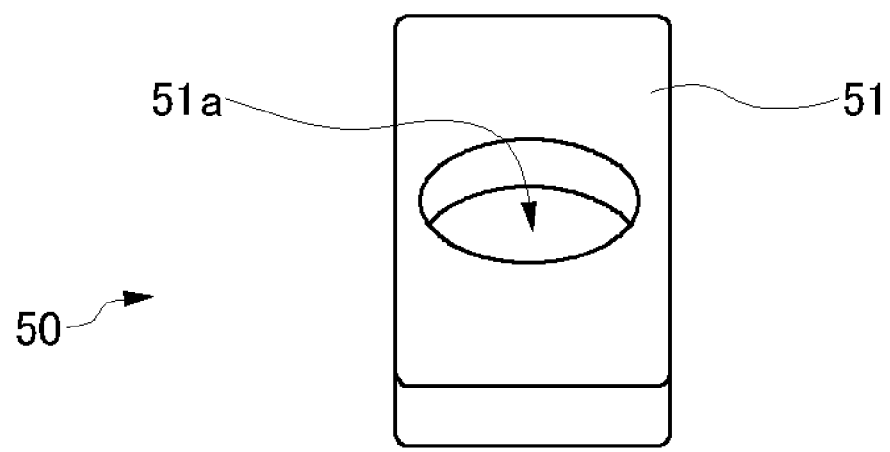
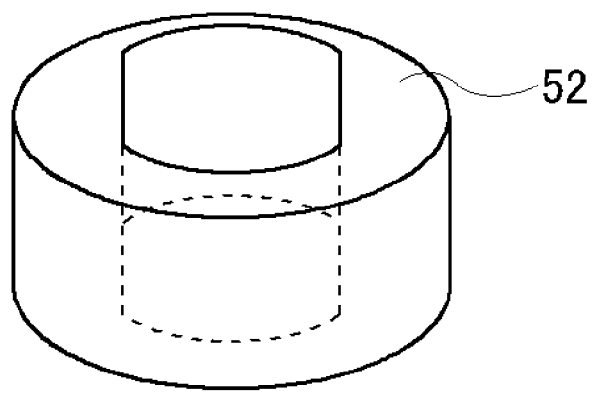

DIGITAL MICROSCOPE

RELATED APPLICATION

This application claims the benefit of Patent Application No. 2010-108404 filed on May 10, 2010 in Japan, the entire contents of which are incorporated herein by reference.

TECHNICAL FIELD

The present invention relates to a digital microscope and, more particularly, to a digital microscope that picks up an image using bright field lighting and dark field lighting.

BACKGROUND ART

Conventionally, there has been known a digital microscope that picks up an image of a sample using bright field lighting or dark field lighting. In a bright field observation performed using the bright field lighting, light parallel to a magnifying optical system is irradiated on a sample and reflected light of the light is observed. On the other hand, in a dark field observation performed using the dark field lighting, scattered light and reflected light generated by obliquely irradiating light on a sample are observed.

Patent Literature 1 proposes a magnifying observation device that can perform both of the bright field observation and the dark field observation. The magnifying observation device described in Patent Literature 1 includes an optical fiber cable incorporating a first optical fiber bundle connected to an epi-illumination section and a second optical fiber bundle connected to a side illumination section. The magnifying observation device switches, with switching means included in a body section, whether light from a light source is led into the first optical fiber bundle.

In Patent Literature 1, when the light is not led into the first optical fiber bundle, the side illumination is performed through the second optical fiber bundle. When the light is led into the first optical fiber bundle, both of the side illumination and the epi-illumination are performed. In Patent Literature 1, since the intensity of epi-illumination light is large and a direct reflected light component from a sample is large, the epi-illumination is substantially performed by leading the light into the first optical fiber bundle.

CITATION LIST

Patent Literature

Patent Literature 1: Japanese Patent Laid-Open No. 2009-128881

SUMMARY OF INVENTION

Technical Problem

The digital microscope in the past explained above can perform one of the bright field observation and the dark field observation by switching the bright field lighting and the dark field lighting. However, to put it differently, the digital microscope can perform only one of the bright field observation and the dark field observation. On the other hand, there is a demand for a digital microscope that can appropriately display micro unevenness and the like on the surface of a sample.

In view of the above background, it is an object of the present invention to provide a digital microscope that can more appropriately display a sample.

Solution to Problem

A digital microscope according to the present invention includes: a bright field lighting section that supplies bright field light to a sample; a dark field lighting section that supplies dark field light to the sample; an operating section for designating a mixture ratio of the bright field light and the dark field light; a mixture ratio changing unit that changes the mixture ratio of the bright field light and the dark field light according to operation in the operating section; a magnifying optical system that concentrates light reflected or scattered on the sample; an imaging sensor section that photoelectrically converts light made incident through the magnifying optical system to pick up an image of the sample; and a displaying section that displays the image picked up by the imaging sensor section. The mixture ratio changing unit includes: a first light path for supplying light to the bright field lighting section; a second light path for supplying light to the dark field lighting section; and a third light path for causing light from a light source to enter the first light path and the second light path. A light entry end of the first light path and a light entry end of the second light path are arranged adjacent to each other to face in the same direction. A light exit end of the third light path is arranged to be opposed to both of the light entry ends. The mixture ratio changing unit moves the light exit end according to an operation amount in the operating section while keeping a state in which the light exit end and both of the light entry ends are opposed to each other. As the light paths, an optical fiber, an optical fiber bundle, an acrylic, and the like can be used. The operating section may be a dial for controlling a movement amount of the light exit end according to a rotation amount.

With the configuration in which the mixture ratio of the bright field light and the dark field light can be changed according to the operation in the operating section in this way, it is possible to appropriately display the texture and the like of the surface of the sample that is less easily seen with the bright field lighting or the dark field lighting. Since the appearance of the sample gradually changes according to the operation, information can be obtained from the change as well. Further, with the simple configuration for moving the light exit end while keeping the state in which the light exit end of the third light path for transmitting the light from the light source is opposed to the light entry ends of the first light path and the second light path, it is possible to adjust, according to the movement of the light exit end, an amount of light caused to enter the first light path and the second light path.

In the digital microscope according to the present invention, the first light path or the second light path may be configured by an optical fiber bundle obtained by binding a plurality of optical fibers. The plurality of optical fibers may be woven in between the light entry end and light exit end of the light path. With the configuration in which the plurality of optical fibers are woven, it is possible to set the positions of the respective optical fibers at the light exit end different from the positions at the light entry end of the same optical fibers. Consequently, even if light is made incident on the plurality of optical fibers present in a part of a region (e.g., a left half region) of the light entry end, since the optical fibers on which the light is made incident are distributed over the entire optical fiber bundle at the light exit end, it is possible to emit light from the entire light exit end.

In the digital microscope according to the present invention, the diameter of the light entry end of the first light path may be smaller than the diameter of the light entry end of the second light path. With this configuration, it is possible to reduce an amount of light supplied to the bright field lighting section and appropriately display an image making the best use of a component of reflected light or scattered light of the dark field light.

The digital microscope according to the present invention may include: a plurality of objective lenses mounted on a revolver; ring lenses respectively attached to the plurality of objective lenses; and a plurality of fourth light paths for supplying light to the respective ring lenses. Light entry ends of the respective fourth light paths may be arranged at an equal angle around a rotation center of the revolver. Input ends of the fourth light paths and an output end of the second light path may be configured to be opposed to each other when the revolver is rotated. With this configuration, even when the revolver is rotated to change the objective lens, it is possible to supply the dark field light to the ring lenses. The configuration for changing the mixture ratio of the bright field lighting and the dark field lighting can be applied to the digital microscope including the revolver as well.

The digital microscope according to the present invention may include: an objective lens detecting unit that detects which objective lens among the plurality of objective lenses is used; and a light emitting unit that lights a color corresponding to the detected objective lens. With this configuration, it is possible to easily grasp an objective lens currently in use.

The digital microscope according to the present invention may include: an objective lens detecting unit that detects which objective lens among the plurality of objective lenses is used; and an arithmetic processing section that converts, on the basis of the magnification of the detected objective lens and the magnification of the magnifying optical system, a distance on an image displayed on the displaying section into an actual distance. With this configuration, even when the objective lens is changed, it is possible to easily calculate an actual distance between two points reflected in an image. The magnification of the magnifying optical system can be detected by a publicly-known method.

A digital microscope according to another aspect of the present invention includes: a bright field lighting section that supplies bright field light to a sample; a dark field lighting section that supplies dark field light to the sample; an operating section for designating a mixture ratio of the bright field light and the dark field light; a mixture ratio changing unit that changes the mixture ratio of the bright field light and the dark field light according to operation in the operating section; a magnifying optical system that concentrates light reflected or scattered on the sample; an imaging sensor section that photoelectrically converts light made incident through the magnifying optical system to pick up an image of the sample; and a displaying section that displays the image picked up by the imaging sensor section.

With the confirmation in which the mixture ratio of the bright field light and the dark field light can be changed according to the operation in the operating section in this way, it is possible to appropriately display the texture and the like of the surface of the sample that is less easily seen with the bright field lighting or the dark field lighting. Since the appearance of the sample gradually changes according to the operation, information can be obtained from the change as well.

Advantageous Effects of Invention

The present invention has an effect that it is possible to appropriately display the texture and the like of the surface of a sample that is less easily seen with the bright field lighting or the dark field lighting.

As explained below, other aspects are present in the present invention. Therefore, the disclosure of the present invention intends to provide a part of the present invention and does not intend to limit the scope of the invention described and claimed herein.

BRIEF DESCRIPTION OF DRAWINGS

FIG. 1 is an overall configuration diagram of a digital microscope according to a first embodiment.

FIG. 2 is a diagram schematically showing the configuration of an image pickup equipment.

FIG. 3 is an exploded view showing the configuration of an objective lens.

FIG. 4 is an exploded view showing the configuration of an operating section.

FIG. 5A is a sectional view showing an example of the position of an output end of an optical fiber bundle during bright field lighting.

FIG. 5B is a sectional view showing an example of the position of the output end of the optical fiber bundle during dark field lighting.

FIG. 5C is a sectional view showing an example of the position of the output end of the optical fiber bundle during bright and dark field mixture lighting.

FIG. 6A is a diagram showing an example of the position of the output end of the optical fiber bundle during the bright field lighting.

FIG. 6B is a diagram showing an example of the position of the output end of the optical fiber bundle during the dark field lighting.

FIG. 6C is a diagram showing an example of the position of the output end of the optical fiber bundle during the bright and dark field mixture lighting.

FIG. 7A is a diagram showing an example of a photographed image only by bright field light.

FIG. 7B is a diagram showing an example of a photographed image by bright and dark field mixture light.

FIG. 7C is a diagram showing an example of a photographed image by the bright and dark field mixture light.

FIG. 7D is a diagram showing an example of a photographed image by the bright and dark field mixture light.

FIG. 7E is a diagram showing an example of a photographed image by the bright and dark field mixture light.

FIG. 7F is a diagram showing an example of a photographed image only by dark field light.

FIG. 8 is a perspective view showing a part of an image pickup equipment including a revolver.

FIG. 9 is a perspective view showing the upper surface of the revolver.

FIG. 10 is an exploded view showing another configuration of an operating section.

DESCRIPTION OF EMBODIMENTS

The present invention is explained in detail below. Embodiments explained below are mere examples of the present invention. The present invention can be modified into various forms. Therefore, specific components and functions disclosed below do not limit the scope of claims.

Digital microscopes according to the embodiments of the present invention are explained below.

First Embodiment

FIG. 1 is a diagram showing an overall configuration of a digital microscope 1 according to a first embodiment. The digital microscope 1 includes an image pickup equipment 10 that picks up an image of a sample and a main unit 40 that performs processing, management, and the like of the picked-up image. The image pickup equipment 10 and the main unit 40 are connected by an optical fiber bundle 19 and a data cable 20. In this embodiment, a form in which the image pickup equipment 10 and the main unit 40 are separated is explained. However, in the digital microscope 1, the image pickup equipment 10 and the main unit 40 may be integrated. A function for processing a picked-up image and a screen for displaying an image may be included in the image pickup equipment 10.

The optical fiber bundle 19 supplies, to the image pickup equipment 10, light from a light source included in the main unit 40. The optical fiber bundle 19 is equivalent to the "third light path" of the present invention. The data cable 20 transmits, to the main unit 40, image data picked up by the image pickup equipment 10 and data indicating a zoom magnification and the position of a stage 11. In FIG. 1, one data cable 20 is shown. However, a cable for transmitting the image data, a cable for transmitting the data of the zoom magnification, and a cable for transmitting the data indicating the position of the stage 11 may be respectively provided.

FIG. 2 is a diagram schematically showing the configuration of the image pickup equipment 10. The image pickup equipment 10 basically includes a configuration same as the configuration of an optical microscope. The image pickup equipment 10 includes the stage 11 on which a sample is placed and an imaging sensor device 15 that picks up an image of the sample placed on the stage 11. An objective lens 12, a half mirror 13, and a magnifying optical system 14 are arranged on an optical axis connecting the stage 11 and the imaging sensor device 15 (hereinafter referred to as "image pickup optical axis A").

The half mirror 13 reflects light made incident from a vertical direction to the image pickup optical axis A. The reflected light is irradiated on the stage 11 as bright field light. The half mirror 13 is equivalent to the "bright field lighting section" that supplies the bright field light to the stage 11. The half mirror 13 transmits light reflected or scattered by the sample on the stage 11 and traveling to the imaging sensor device 15.

A ring lens 16 is attached to the objective lens 12. An optical fiber is connected to the ring lens 16. Light is supplied to the ring lens 16 through the optical fiber. The ring lens 16 supplies dark field light to the stage 11 from a side. A not-shown ring-like prism is attached to the ring lens 16. By the prism, light from the ring lens 16 is directed to the sample placed on the stage 11. The ring lens 16 is equivalent to the "dark field lighting section."

The optical fiber bundle 19 that connects the main unit 40 and the image pickup equipment 10 is divided in the image pickup equipment 10. Near a light exit end of the optical fiber bundle 19, two optical fiber bundles 17 and 18 are arranged adjacent to each other to face in the same direction. The light exit end of the optical fiber bundle 19 and light entry ends of the optical fiber bundles 17 and 18 are opposed to each other. Light emitted from the optical fiber bundle 19 enters the optical fiber bundles 17 and 18. One of the two optical fiber bundles 17 and 18 is the optical fiber bundle 17 for supplying light to the half mirror 13. The optical fiber bundle 17 is equivalent to the "first light path." An irradiation optical system 21 including plural lenses and a mirror is arranged at a light exit end of the optical fiber bundle 17. Light emitted from the optical fiber bundle 17 is made incident on the half mirror 13 through the irradiation optical system 21. The other optical fiber bundle 18 is an optical fiber for supplying light to the ring lens 16. The optical fiber bundle 18 extends to the objective lens 12 to which the ring lens 16 is attached. The optical fiber bundle 18 is equivalent to the "second light path." In this embodiment, an example in which the first light path is configured by the optical fiber bundle 17 is explained. However, the first light path may be configured by an acrylic.

The diameter of the optical fiber bundle 17 is smaller than the diameter of the optical fiber bundle 18 and the optical fiber bundle 19. The diameter of the optical fiber bundle 17 is set small in order to suppress a light amount of the bright field light such that a component of reflected light or scattered light of the dark field light is appropriately reflected on an image during bright and dark field mixture lighting. In this embodiment, the diameter of the optical fiber bundle 17 is 3 mm and the diameter of the optical fiber bundle 18 and the optical fiber bundle 19 is 6 mm. These numerical values are examples. The diameters of the respective optical fibers bundles 17 to 19 are not limited to the numerical values. The diameter of the optical fiber bundle 17 is desirably 2 to 4 mm and more desirably 2 to 3 mm. The diameter of the optical fiber bundles 18 and 19 is desirably 6 to 7 mm.

FIG. 3 is an exploded view showing the configuration of the objective lens 12. The objective lens 12 includes a cylindrical lens holding member 23b that holds plural lenses 23a and a case 24 that covers the lens holding member 23b. The case 24 includes an upper case 24a and a lower case 24b. The ring lens 16 is fit in the inside of the lower case 24b. In other words, the ring lens 16 is located in a space between the lower case 24b and the lens holding member 23b. An optical fiber bundle 25 is inserted through a hole 24c formed adjacent to a hollow portion of the upper case 24a. A light entry end of the optical fiber bundle 25 is opposed to a light exit end of the optical fiber bundle 18. The optical fiber bundle 25 is divided into pieces and connected to the ring lens 16 through the space between the lens holding member 23b and the case 24. In FIG. 3, four optical fibers are shown. However, the optical fiber bundle 25 including a larger number of optical fibers may be used.

The optical fiber bundle 19 is held by a holding member 22 (see FIG. 2). The holding member 22 slides according to the operation of an operating section 26 (see FIG. 1). The direction of the slide is the direction of a straight line that connects the center of the light entry end of the optical fiber bundle 17 and the center of the light entry end of the optical fiber bundle 18 in a plane that keeps a state in which the light exit end of the optical fiber bundle 19 and the light entry ends of the optical fiber bundle 17 and the optical fiber bundle 18 are opposed to each other. With this configuration, a mixture ratio of the bright field light and the dark field light can be changed by changing an amount of light that enters from the optical fiber bundle 19 into the optical fiber bundle 17 and the optical fiber bundle 18. An amount of movement of the optical fiber bundle 19 depends on an amount of operation of the operating section 26 provided in the image pickup equipment 10. In this embodiment, the operating section 26 is the operating section 26 of a dial type as shown in FIG. 1.

FIG. 4 is an exploded view showing the configuration of the operating section 26. The operating section 26 includes a dial section 27 operated by a user, a base section 28 that pivotably supports the dial section 27, a lid 29 of the dial section 27, an actuation section 30 including a hole 30a into which the holding member 22 is inserted, and a tabular section 31 that pivots about a convex portion 28a formed in the base section 28. A convex portion 31b formed in the tabular section 31 is inserted into a hole 27b formed in the dial section 27. An elliptical section 30b present in an upper part of the actuation section 30 is inserted into a hole 29a formed in the lower side of the lid 29.

With the configuration explained above, when the dial section 27 pivots, the tabular section 31 pivots about a concave portion 31a. Consequently, the actuation section 30 is pushed by the edge of a hole 31c of the tabular section 31 to slide in the front and back direction on the paper surface of the figure. The holding member 22 inserted into the actuation section 30 also slides according to the slide of the actuation section 30.

FIGS. 5A to 5C are sectional views showing an example of the positions where an output end of the optical fiber bundle 19 is located when the mixture ratio of the bright field light and the dark field light is changed. FIGS. 6A to 6C are diagrams showing an example of the positions of the output end of the optical fiber bundle 19. FIGS. 5A and 6A show an example of the position of the output end of the optical fiber bundle 19 during the bright field lighting. FIGS. 5B and 6B show an example of the position of the output end of the optical fiber bundle 19 during the dark field lighting. FIGS. 5C and 6C show an example of the position of the output end of the optical fiber bundle 19 during the bright and dark field mixture lighting. During the bright field lighting, as shown in FIGS. 5A and 6A, the output end of the optical fiber bundle 19 is present on the optical fiber bundle 17 side. The optical fiber bundle 19 supplies light only to the optical fiber bundle 17. Conversely, during the dark field lighting, as shown in FIGS. 5B and 6B, the output end of the optical fiber bundle 19 is present on the optical fiber bundle 18 side. The optical fiber bundle 19 supplies light only to the optical fiber bundle 18. During the bright and dark field mixture lighting, as shown in FIGS. 5C and 6C, the output end of the optical fiber bundle 19 is present in a position covering both of the optical fiber bundle 17 and the optical fiber bundle 18. The optical fiber bundle 19 supplies light to both of the optical fiber bundle 17 and the optical fiber bundle 18.

The optical fiber bundle 17 and the optical fiber bundle 18 are configured by weaving in plural optical fibers between the light entry ends and the light exit ends thereof. With the configuration in which the plural optical fibers are woven in, the positions of the respective optical fibers at the light exit ends are different from the positions of the same optical fibers at the light entry ends. More specifically, the positions of the respective optical fibers in the cross sections of the optical fiber bundles are arranged at random at the light entry ends and the light exit ends. Consequently, as shown in FIG. 6C, even if light is made incident on the plural optical fibers present in a part of regions of the light entry ends of the optical fibers 17 and 18, since the optical fibers, on which the light is made incident, are distributed over the entire optical fiber bundles at the light exit ends, the light can be emitted from the entire light exit ends. Therefore, when the emitted light is irradiated on a sample via the half mirror 13 or the ring lens 16, it is possible to irradiate the light from all the directions. It is possible to prevent a shadow from being formed because of the incidence of the light on a part of the regions of the optical fiber bundles 17 and 18.

The position of the optical fiber bundle 19 is gradually slid from a state shown in FIG. 6A to a state shown in FIG. 6B to increase a light amount of the dark field light little by little. This makes it possible to observe a state of the surface of the sample that gradually changes.

Next, the main unit 40 is explained. The main unit 40 includes a communication interface that receives image data from the image pickup equipment 10, a control section that performs editing and management of a received image, a monitor 41 that displays the image data, and an operating section 42 that receives operation from the user. The control section has a function of processing the received image data to generate a three-dimensional image, adjusting contrast, and performing enhancement of an edge. The control section has a function of calculating, when two points, a distance between which is desired to be measured, are specified in the operating section 42, the distance between the two points. Besides, the main unit 40 can perform various kinds of image processing. The digital microscope 1 according to the first embodiment is explained above.

The digital microscope 1 according to the first embodiment can change the mixture ratio of the bright field light and the dark field light according to operation in the operating section 26. Therefore, it is possible to appropriately display the texture and the like of the surface of a sample that is less easily seen with the bright field lighting or the dark field lighting. FIGS. 7A to 7F are diagrams showing images obtained by picking up an image of the surface of a multi-cell of a solar battery by the digital microscope 1 according to this embodiment. FIG. 7A is an image by only the bright field light. FIG. 7F is an image by only the dark field light. FIGS. 7B to 7E are images obtained by gradually changing the mixture ratio from the bright field to the dark field. The appearance of the same surface of the sample is varied by changing the mixture ratio in this way. In this example, the image shown in FIG. 7D clearly reflects unevenness on the surface of the sample.

The digital microscope 1 according to the first embodiment can observe, according to operation, a state in which the appearance of the sample gradually changes as shown in FIGS. 7A to 7F. Therefore, information can be obtained from the change as well.

The digital microscope 1 according to the first embodiment can change the mixture ratio of the bright field light and the dark field light with a simple configuration in which the output end of the optical fiber bundle 19 and input ends of the optical fiber bundle 17 and the optical fiber bundle 18 are arranged to be opposed to each other and the output end of the optical fiber bundle 19 is slid. For example, in the magnifying observation device described in Patent Literature 1 described above, the optical fiber cable incorporating the first optical fiber bundle and the second optical fiber bundle is necessary in order to switch the bright field lighting and the dark field lighting. However, costs for such divided fibers are extremely high. In this embodiment, since normal optical fiber bundles can be used, it is possible to suppress manufacturing costs.

Second Embodiment

Next, a digital microscope according to a second embodiment is explained. A basic configuration of the digital microscope according to the second embodiment is the same as that of the digital microscope 1 according to the first embodiment. The digital microscope according to the second embodiment includes plural objective lenses 12 mounted on a revolver 32. It is possible to easily change a magnification by rotating the revolver 32 to change the objective lens 12.

FIG. 8 is a perspective view showing a part of an image pickup equipment including the revolver 32. In FIG. 8, an example in which three objective lenses 12 are mounted on the revolver 32 is shown. However, the number of the objective lenses 12 mounted on the revolver 32 may be four or more or may be two. It is possible to change the objective lens 12 used for an observation by rotating the revolver 32.

FIG. 9 is a perspective view showing the upper surface of the revolver 32. On the upper surface of the revolver 32, holes 34 for exposing the light entry end of the optical fiber bundle 25 (see FIG. 3) for supplying light to the ring lens 16 are formed beside holes 33 through which the image pickup optical axis A passes. Plural optical fiber bundles, light entry ends of which are exposed from the respective holes 34, are equivalent to the "plurality of fourth light paths." The holes 34 are formed at an equal interval (a 120° interval) around a rotation center O of the revolver 32. Therefore, when the revolver 32 is rotated to change the objective lens 12, regardless of which of the objective lenses 12 is used, the hole 34 is located in a position opposed to the light exit end of the optical fiber bundle 18. Consequently, even if the revolver 32 is rotated to change the objective lens 12, it is possible to supply dark field light to the ring lens 16 and perform an observation by mixed light of bright field light and dark field light.

On the upper surface of the revolver 32, identifiers 35 for specifying the objective lenses 12 are provided in positions symmetrical to the respective objective lenses 12 across the rotation center. An optical reading device 37 that reads the identifiers 35 is embedded in a lid section 36 that covers the upper side of the revolver 32. It is possible to specify the objective lens 12 used for an observation by reading the identifiers 35 with the optical reading device 37. The identifiers 35 and the optical reading device 37 are equivalent to the "objective lens detecting unit." The optical reading device transmits data of the read identifiers to the main unit 40. Consequently, the main unit 40 can specify the objective lens 12 used for an observation.

The main unit 40 can display, for example, information for specifying the objective lens 12 in use by receiving data for specifying the objective lenses 12. As the information for specifying the objective lenses 12, information concerning the magnifications of the objective lenses 12 may be displayed or colors set in advance according to the objective lenses 12 may be lit. By displaying the objective lenses 12 in the colors, it is possible to intuitively understand which of the objective lenses 12 is used.

The main unit 40 can grasp a total magnification by the image pickup equipment 10 by receiving information concerning a zoom magnification by the magnifying optical system 14 and information concerning the magnifications of the objective lenses 12. Therefore, it is possible to convert a distance between two points on an image into an actual distance. In other words, in the digital microscope including the plural objective lenses, it is possible to realize an ACS (Auto Calibration System). Details of the ACS are described in Japanese Patent Laid-Open No. 2008-233201.

The digital microscope according to the present invention is explained in detail above with reference to the embodiments. However, the present invention is not limited to the embodiments explained above. In the embodiments, the operating section 26 of the dial type is explained as an example of the operating section for instructing the mixture ratio of the bright field light and the dark field light. However, the operating section does not always have to be the dial type.

FIG. 10 is an exploded view showing the configuration of an operating section 50 of a slide type. The operating section 50 of the slide type includes a slide section 51 operated by the user, a base section 52 which movably supports a slide, and a lid 53 of the slide section 51. The holding member 22 that holds the optical fiber bundle 19 is inserted into a hole 51a formed in the slide section 51. The slide section 51 is moved back and forth on the paper surface of the figure, whereby the holding member 22 is also slid.

In the second embodiment explained above, an example in which the identifiers 35 and the optical reading device 37 are used in order to specify the objective lens 12 in use is explained. However, means for specifying the objective lens 12 is not limited to the means explained above. For example, a rotation angle of the revolver 32 may be detected using a rotary encoder or a potentiometer and the objective lens 12 may be specified from the rotation angle.

In the image pickup equipment 10 explained in the embodiments explained above, a filter for enhancing an edge and contrast may be inserted on an optical path for supplying the dark field light. For example, the filter can be inserted between the optical fiber bundle 18 and the optical fiber bundle 25 or under the ring lens 16 (between the ring lens 16 and the stage 11). Consequently, an image in which an edge and contrast are enhanced can be obtained.

In the image pickup equipment 10 explained in the embodiments, a direction in which the bright field light and the dark field light are irradiated may be controlled to display a shadow of a sample. For example, a part of light irradiated from the ring lens 16 may be cut by providing a movable filter for cutting light in a lower part of the ring lens 16. By moving the filter, it is possible to change a direction in which the dark field light is irradiated on the sample and acquire an image shadowed by lights from various angles.

The preferred embodiments of the present invention conceivable at this stage are explained above. However, various modifications are possible for the embodiments. It is intended that the appended claims include all such modifications present within the true spirit and the range of the present invention.

INDUSTRIAL APPLICABILITY

As explained above, the present invention has an effect it is possible to appropriately display the texture and the like of the surface of a sample that is less easily seen with the bright field lighting or the dark field lighting. The present invention is useful as a digital microscope.

REFERENCE SIGNS LIST 1 digital microscope
10 image pickup equipment
11 stage
12 objective lenses
13 half mirror
14 magnifying optical system
15 imaging sensor device
16 ring lens
17 to 19 optical fiber bundles
20 data cable
21 illumination optical system 22 holding member
23a lenses
23b lens holding member
24 case
25 optical fiber bundle
26 operating section
32 revolver
40 main unit
41 monitor
42 operating section

The invention claimed is:

1. A digital microscope comprising:
a bright field lighting section that supplies bright field light to a sample;
a dark field lighting section that supplies dark field light to the sample;
an operating section for designating a mixture ratio of the bright field light and the dark field light;
a mixture ratio changing unit that changes the mixture ratio of the bright field light and the dark field light according to operation in the operating section;
a magnifying optical system that condenses light reflected or scattered on the sample;
an image sensor section that photoelectrically converts light made incident through the magnifying optical system to pick up an image of the sample; and
a displaying section that displays the image picked up by the image sensor section, wherein
the mixture ratio changing unit includes:
a first light path for supplying light to the bright field lighting section;
a second light path for supplying light to the dark field lighting section;
a third light path for causing light from a light source to enter the first light path and the second light path, and wherein
a light entry end of the first light path and a light entry end of the second light path are arranged adjacent to each other to face in a same direction, a light exit end of the third light path is arranged to be opposed to both of the light entry ends, and the mixture ratio changing unit moves the light exit end according to an operation amount in the operating section while keeping a state in which the light exit end and both of the light entry ends are opposed to each other;
a plurality of objective lenses mounted on a revolver;
ring lenses respectively attached to the plurality of objective lenses;
a plurality of fourth light paths for supplying light to the respective ring lenses, wherein light entry ends of the respective fourth light paths are arranged at an equal angle around a rotation center of the revolver, and input ends of the fourth light paths and an output end of the second light path are opposed to each other when the revolver is rotated;
an objective lens detecting unit that detects which objective lens among the plurality of objective lenses is used; and
a light emitting unit that lights a color corresponding to the detected objective lens.

2. The digital microscope according to claim 1, wherein the first light path or the second light path is configured by an optical fiber bundle obtained by binding a plurality of optical fibers, and the plurality of optical fibers are woven in between the light entry end and light exit end of the light path.

3. The digital microscope according to claim 1, wherein a diameter of the light entry end of the first light path is smaller than a diameter of the light entry end of the second light path.

4. The digital microscope according to claim 1, wherein the operating section is a dial for controlling a movement amount of the light exit end according to a rotation amount.

5. The digital microscope according to claim 1, comprising:
an arithmetic processing section that converts, on the basis of a magnification of the detected objective lens and a magnification of the magnifying optical system, a distance on an image displayed on the displaying section into an actual distance.

* * * * *